(12) United States Patent
Cunningham et al.

(10) Patent No.: US 11,493,374 B2
(45) Date of Patent: Nov. 8, 2022

(54) MINIMIZING A CREST IN A MULTI-TONE DRIVE SIGNAL IN A VIBRATORY METER

(71) Applicant: Micro Motion, Inc., Boulder, CO (US)

(72) Inventors: Timothy J. Cunningham, Boulder, CO (US); Matthew Joseph Rensing, Cincinnati, OH (US); Mark James Bell, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 421 days.

(21) Appl. No.: 16/618,512

(22) PCT Filed: Jun. 14, 2017

(86) PCT No.: PCT/US2017/037482
§ 371 (c)(1),
(2) Date: Dec. 2, 2019

(87) PCT Pub. No.: WO2018/231220
PCT Pub. Date: Dec. 20, 2018

(65) Prior Publication Data
US 2020/0166395 A1 May 28, 2020

(51) Int. Cl.
*G01F 1/84* (2006.01)
*G01F 25/10* (2022.01)

(52) U.S. Cl.
CPC .......... *G01F 1/8436* (2013.01); *G01F 1/8468* (2013.01); *G01F 25/10* (2022.01)

(58) Field of Classification Search
CPC ....... G01F 1/8436; G01F 1/8468; G01F 25/10
See application file for complete search history.

(56) References Cited

U.S. PATENT DOCUMENTS

2007/0017274 A1    1/2007    Wheeler et al.
2014/0190238 A1    7/2014    Mcanally et al.

*Primary Examiner* — Erika J. Villaluna
(74) *Attorney, Agent, or Firm* — The Ollila Law Group LLC

(57) ABSTRACT

A system (800) for minimizing a crest in a multi-tone drive signal in a vibratory meter (5) is provided. The system (800) includes a drive signal generator (810) configured to generate the multi-tone drive signal for the vibratory meter (5) and a drive signal detector (820). The drive signal detector (820) is configured to receive the multi-tone drive signal, determine a first maximum amplitude of the multi-tone drive signal having a component at a first phase, determine a second maximum amplitude of the multi-tone drive signal having the component at a second phase, and compare the first maximum amplitude and the second maximum amplitude.

10 Claims, 6 Drawing Sheets

MINIMIZING A CREST IN A MULTI-TONE DRIVE SIGNAL IN A VIBRATORY METER

TECHNICAL FIELD

The embodiments described below relate to drive signals for a vibratory meter and, more particularly, to minimizing a crest in a multi-tone drive signal in a vibratory meter.

BACKGROUND

Vibratory meters, such as for example, Coriolis flow meters, liquid density meters, gas density meters, liquid viscosity meters, gas/liquid specific gravity meters, gas/liquid relative density meters, and gas molecular weight meters, are generally known and are used for measuring characteristics of fluids. Generally, the vibratory meters comprise a sensor assembly and a meter electronics. The material within the sensor assembly may be flowing or stationary. Each type of sensor assembly may have unique characteristics, which a meter must account for in order to achieve optimum performance. For example, some sensor assemblies may require a tube apparatus to vibrate at particular displacement levels. Other sensor assembly types may require special compensation algorithms.

The meter electronics, among performing other functions, typically include stored sensor calibration values for the particular sensor assembly being used. For example the meter electronics may include a reference sensor time period (i.e. the inverse of the reference resonant frequency). The reference sensor time period represents a fundamental measurement performance of the sensor geometry for a specific sensor assembly, as measured in the factory under reference conditions. A change between a sensor time period measured after a vibratory meter is installed at a customer site and a reference sensor time period may represent physical change in the sensor assembly due to coating, erosion, corrosion, or damage to conduits in the sensor assembly, in addition to other causes. A meter verification or health check test can detect these changes.

The meter verification test is typically performed using a multi-tone drive signal, which may also be referred to as a multi-sine, multi-component, or the like, drive signal that is applied to the sensor assembly. A multi-tone drive signal is typically comprised of a resonant component, or drive tone, that is at the resonant frequency of a sensor assembly and a plurality of non-resonant components, or test tones, that have frequencies spaced apart from the drive tone frequency. This is distinct from an approach where multiple test tones are cycled sequentially. Any time-variance in the system (e.g. temperature-dependent effects, changes in flow) could corrupt a characterization of the frequency response of the sensor assembly if the sequential tone approach is used. The multi-tone drive signal is advantageous because the sampled data is obtained simultaneously.

However, the multi-tone drive signal will have crests that form when the components constructively interfere. When these crests exceed a power capacity of a drive circuit (commonly called saturation), clipping and intermodulation distortion may be present in the multi-tone drive signal. These intermodulation distortions can cause a characterization of the sensor assembly's frequency response to be inaccurate. Accordingly, there is a need to minimize the crests in the multi-tone drive signal.

SUMMARY

A system for minimizing a crest in a multi-tone drive signal in a vibratory meter is provided. According to an embodiment, the system comprises a drive signal generator configured to generate the multi-tone drive signal for the vibratory meter, and a drive signal detector. The drive signal detector is configured to receive the multi-tone drive signal, determine a first maximum amplitude of the multi-tone drive signal having a component at a first phase, determine a second maximum amplitude of the multi-tone drive signal having the component at a second phase, and compare the first maximum amplitude and the second maximum amplitude.

A method for minimizing a crest in a multi-tone drive signal in a vibratory meter is provided. According to an embodiment, the method comprises receiving the multi-tone drive signal, determining a first maximum amplitude of the multi-tone drive signal having a component at a first phase, determining a second maximum amplitude of the multi-tone drive signal having a component at a second phase, and comparing the first maximum amplitude and the second maximum amplitude.

ASPECTS

According to an aspect, a system (800) for minimizing a crest in a multi-tone drive signal in a vibratory meter (5) comprises a drive signal generator (810) configured to generate the multi-tone drive signal for the vibratory meter (5) and a drive signal detector (820). The drive signal detector (820) is configured to receive the multi-tone drive signal, determine a first maximum amplitude of the multi-tone drive signal having a component at a first phase, determine a second maximum amplitude of the multi-tone drive signal having the component at a second phase, and compare the first maximum amplitude and the second maximum amplitude.

Preferably, the drive signal detector (820) is further configured to determine which of the first maximum amplitude value and the second maximum amplitude value is a minimal crest amplitude based on the comparison.

Preferably, the drive signal detector (820) is further configured to determine which of the first phase and the second phase is associated with the minimal crest amplitude.

Preferably, the drive signal detector (820) is further configured to compare the first maximum amplitude and the second maximum amplitude at two or more different carrier frequencies of the component.

Preferably, the drive signal detector (820) is further configured to determine a third maximum amplitude of the multi-tone drive signal having the component at a third phase and a fourth maximum amplitude of the multi-tone drive signal having the component at a fourth phase.

Preferably, the drive signal generator (810) is further configured to generate the multi-tone drive signal comprising a drive tone and at least one additional component having a phase at one of the first phase and the second phase.

According to an aspect, a method for minimizing a crest in a multi-tone drive signal in a vibratory meter comprises receiving the multi-tone drive signal, determining a first maximum amplitude of the multi-tone drive signal having a component at a first phase, determining a second maximum amplitude of the multi-tone drive signal having a component at a second phase, and comparing the first maximum amplitude and the second maximum amplitude.

Preferably, further comprising determining which of the first maximum amplitude value and the second maximum amplitude value is a minimal crest amplitude based on the comparison.

Preferably, further comprising determining which of the first phase and the second phase is associated with the minimal crest amplitude.

Preferably, further comprising comparing the first maximum amplitude and the second maximum amplitude at two or more different carrier frequencies of the component.

Preferably, further comprising determining a third maximum amplitude of the multi-tone drive signal having the component at a third phase and a fourth maximum amplitude of the multi-tone drive signal having the component at a fourth phase.

Preferably, further comprising generating the multi-tone drive signal comprising a drive tone and at least one additional component having a phase at one of the first phase and the second phase.

BRIEF DESCRIPTION OF THE DRAWINGS

The same reference number represents the same element on all drawings. It should be understood that the drawings are not necessarily to scale.

DETAILED DESCRIPTION

FIGS. 1-8 and the following description depict specific examples to teach those skilled in the art how to make and use the best mode of embodiments of minimizing a crest of a multi-tone drive signal for a vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of minimizing the crest of the multi-tone drive signal for the vibratory meter. As a result, the embodiments described below are not limited to the specific examples described below, but only by the claims and their equivalents.

Minimizing the crest in the multi-tone drive signal includes receiving a multi-tone drive signal, determining a first maximum amplitude of the multi-tone drive signal having a component at a first phase. A second maximum amplitude of the multi-tone drive signal is determined at the second phase. The first and second maximum amplitudes are compared. By comparing the first and second maximum amplitudes, the first or the second phase may be associated with a minimal crest amplitude. Additional components and additional phases may also be used to determine the minimal crest amplitude.

The phase associated with the minimal crest amplitude can be used to generate a multi-tone drive signal that has a minimal crest. Accordingly, by minimizing the crest, a crest in the multi-tone drive signal may not saturate a drive amplifier in the drive circuit of a vibratory meter. This can prevent clipping and the formation of intermodulation distortion signals while also ensuring a sufficient signal-to-noise ratio of the multi-tone drive signal. By preventing the intermodulation distortion signals and increasing the signal-to-noise ratio, the meter verification tests may be more accurate and, therefore, can more quickly and correctly detect erosion, corrosion, deposits, etc., in conduits of the vibratory meter.

Figure 1:
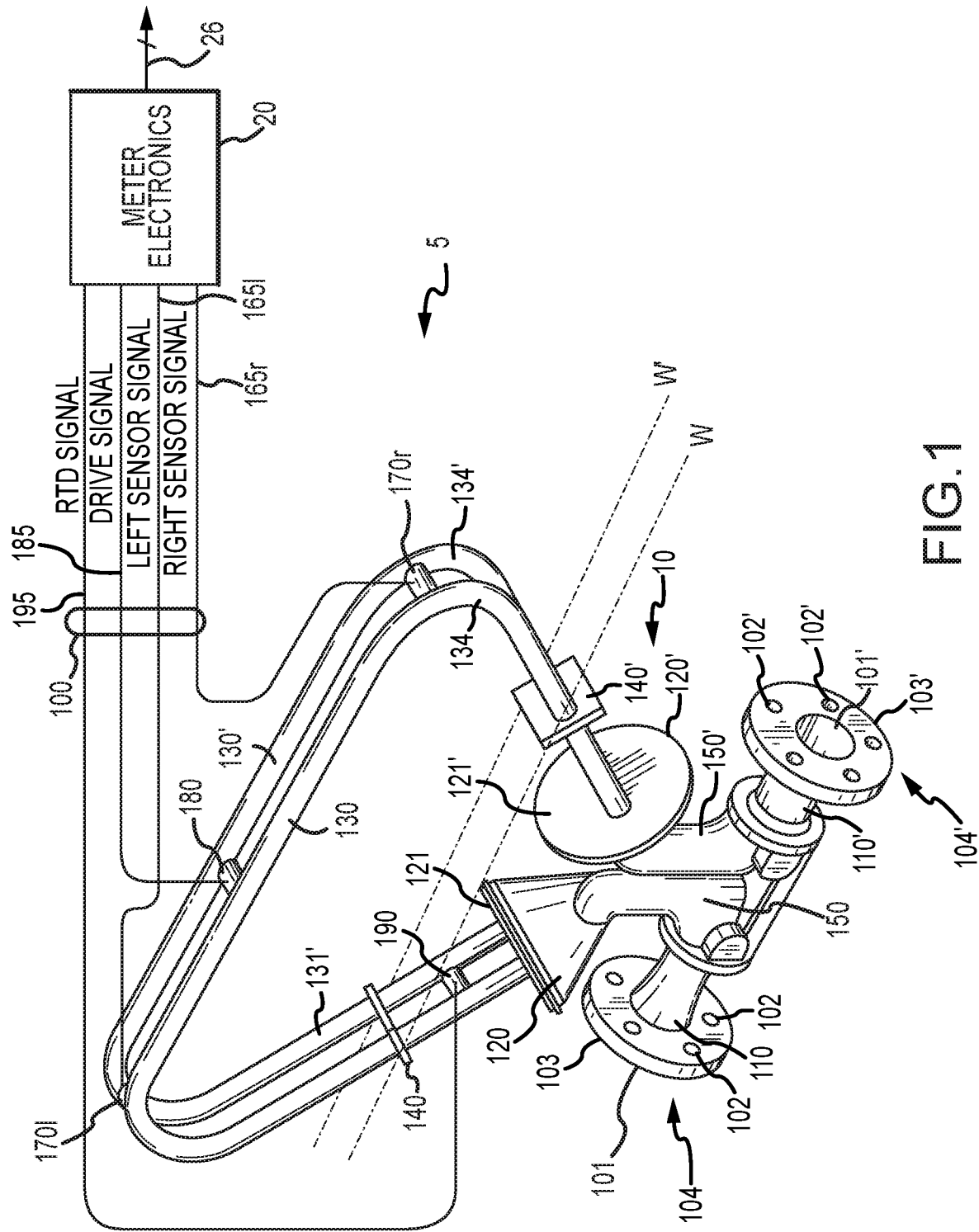
FIG. 1 shows a vibratory meter 5 for minimizing a crest of a multi-tone drive signal.

FIG. 1 shows a vibratory meter 5 for minimizing a crest of a multi-tone drive signal. As shown in FIG. 1, the vibratory meter 5 comprises a sensor assembly 10 and meter electronics 20. The sensor assembly 10 responds to mass flow rate and density of a process material. The meter electronics 20 is connected to the sensor assembly 10 via leads 100 to provide density, mass flow rate, and temperature information over path 26, as well as other information.

The sensor assembly 10 includes a pair of manifolds 150 and 150', flanges 103 and 103' having flange necks 110 and 110', a pair of parallel conduits 130 and 130', drive mechanism 180, resistive temperature detector (RTD) 190, and a pair of pick-off sensors 170l and 170r. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by drive mechanism 180 in opposite directions about their respective bending axes W and W' and at what is termed the first out-of-phase bending mode of the flow meter. This drive mechanism 180 may comprise any one of many well-known arrangements, such as a magnet mounted to the conduit 130' and an opposing coil mounted to the conduit 130 and through which an alternating current is passed for vibrating both conduits 130, 130'. A suitable drive signal is applied by the meter electronics 20, via lead 185, to the drive mechanism 180.

The meter electronics 20 receives the RTD temperature signal on lead 195, and the left and right sensor signals appearing on leads 100 carrying the left and right sensor signals 165l, 165r, respectively. The meter electronics 20 produces the drive signal appearing on lead 185 to drive mechanism 180 and vibrate conduits 130, 130'. The meter electronics 20 processes the left and right sensor signals and the RTD signal to compute the mass flow rate and the density of the material passing through sensor assembly 10. This information, along with other information, is applied by meter electronics 20 over path 26 as a signal.

To perform meter verification or health check of the sensor assembly, the meter electronics 20 provides a multi-tone drive signal over the lead 185 to the drive mechanism 180. The multi-tone drive signal is comprised of components at different frequencies. These components typically include four test tones at frequencies that are spaced apart from each other and the drive tone. The frequencies of the test tones are typically determined to ensure that intermodulation distortions do not interfere with the test tones, thereby preventing the corruption of a meter verification test. To ensure that the crests of the multi-tone drive signal do not saturate a drive amplifier in the meter electronics 20, the phases are set such that a crest amplitude is minimal or less than what would saturate the drive amplifier when a meter verification test is performed.

Figure 2:
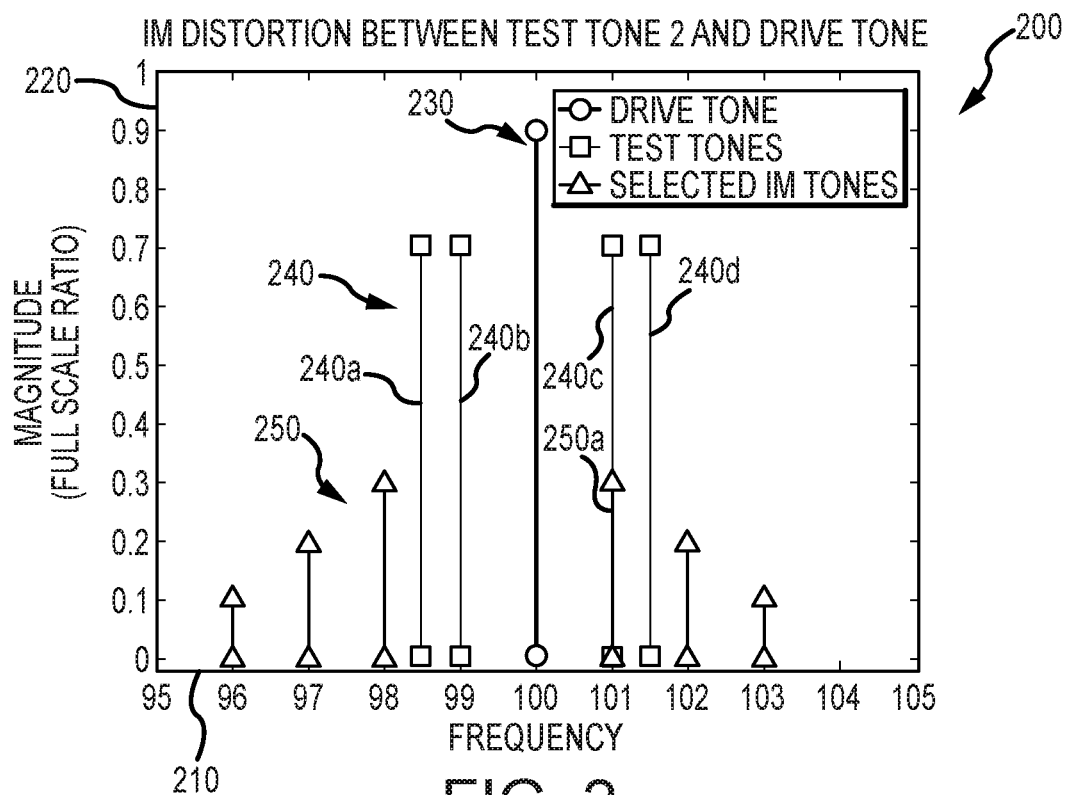
FIG. 2 shows a graph 200 illustrating a multi-tone drive signal with intermodulation distortion.

FIG. 2 shows a graph 200 illustrating a multi-tone drive signal with intermodulation distortion. As shown in FIG. 2, the graph 200 includes a frequency axis 210 and a magnitude axis 220. The frequency axis 210 is in units of hertz (Hz) and ranges from 95 to 105 Hz. The magnitude axis 220 is a full scale ratio and ranges from 0 to 1. The graph 200 includes a drive tone 230, which is a first signal and may be a resonant component of a multi-tone drive signal. The drive tone 230 may be a sinusoidal component with a frequency of 100 Hz.

Also shown are test tones 240, which may be non-resonant components (e.g., not at the resonant frequency of a sensor assembly) of the multi-tone drive signal. The test tones 240 are comprised of a second through fifth signal 240a-240d. The graph 200 also includes intermodulation distortion signals 250. For clarity and discussion purposes, all of the possible intermodulation distortion signals are not shown. Instead, the intermodulation distortion signals 250 shown in FIG. 2 are generated from the drive tone 230 and the third signal 240b ("test tone 2"). One of the intermodulation distortion signals 250 is an interfering signal 250a that has the same frequency as the fourth signal 240c. The test tones 240 may be injected into a drive signal, such as the drive signal appearing on lead 185 in the vibratory meter 5. Accordingly, the drive signal appearing on the lead 185 may be comprised of the drive tone 230 and the second through fifth signals 240a-240d.

The magnitudes of the test tones 240 may be measured to characterize the frequency response of the sensor assembly 10. For example, a magnitude ratio of a component in the sensor signal and a corresponding one of the second through fifth signals 240a-240d can characterize a response of the sensor assembly 10 at that frequency. By utilizing four test tones at different frequencies, a frequency response of the sensor assembly 10 over a range of frequencies can be approximated. However, since the interfering signal 250a, which is at the same frequency as the fourth signal 240c, is not one of the test tones 240 and is not measured as an input of a frequency response characterization, the frequency response of the sensor assembly 10 is incorrect and, therefore, will not correctly detect erosion, corrosion, deposits, etc.

The frequency spacings between the drive tone 230 and the test tones 240 can be determined to ensure that an intermodulation distortion signal does not have the same frequency as one of the test tones 240. However, even if such frequency spacings are determined, cresting of the multi-tone drive signal may result in a crest that saturates a drive amplifier in the meter electronics 20. Due to this saturation, additional intermodulation distortion signals may form, which may be at the same frequency of one of the test tones. To ensure that the characterization of the frequency response of the sensor assembly 10 is accurate, a crest of the multi-tone drive signal may be minimized.

Figure 3:
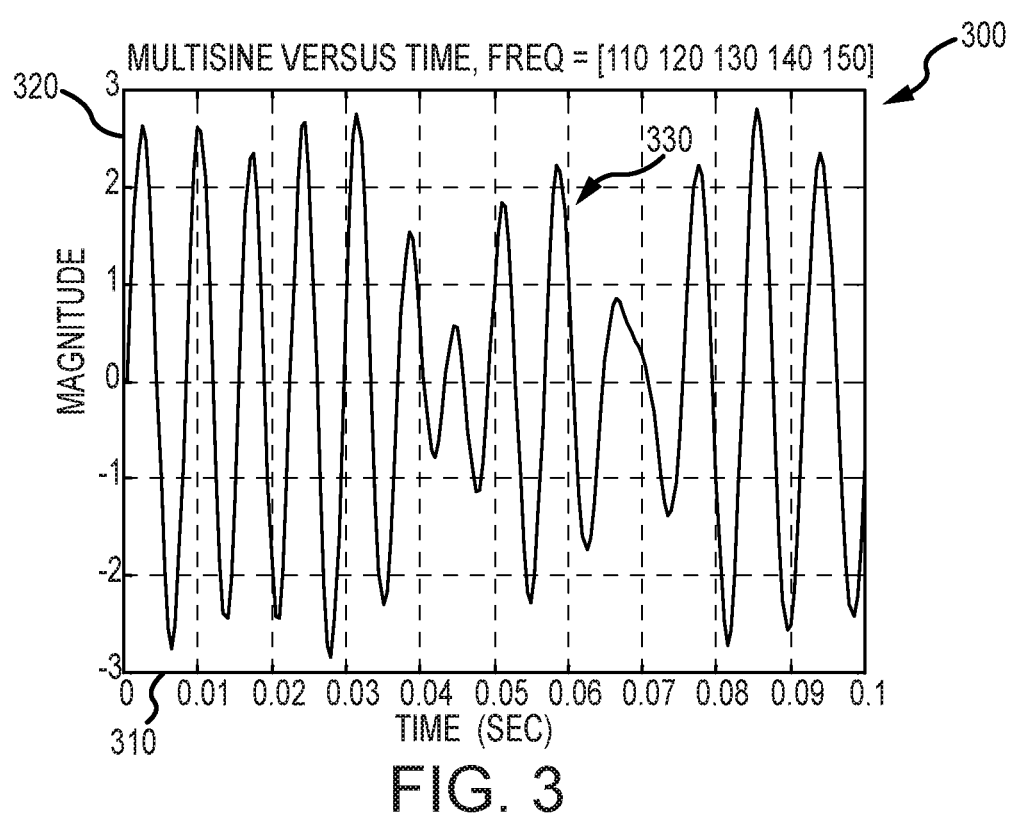
FIG. 3 shows a graph 300 illustrating crests in a multi-tone drive signal.

FIG. 3 shows a graph 300 illustrating crests in a multi-tone drive signal. As shown in FIG. 3, the graph 300 includes a time axis 310 with units of seconds and a magnitude axis 320, which, as shown, is unit-less, but may be in voltage, amps, watts, or the like, in alternative embodiments. The time axis 310 ranges from 0 to 0.1 seconds and the magnitude axis ranges from –3 to 3. The graph 300 also includes a multi-tone drive signal 330 with a crested waveform. The multi-tone drive signal 330 may be comprised of frequency components that are at 110, 120, 130, 140, and 150 Hz.

As can be appreciated, an amplitude of the multi-tone drive signal 330 varies over the time period of 0 to 0.1 seconds. Crests form in the multi-tone drive signal 330 where the test tones and/or drive tone constructively interfere. As shown, the crests are at about 0.03 and 0.085 seconds and have a magnitude of about 2.8. A crest factor for the waveform shown can be determined by the following equation:

$$CF(x) = \frac{\max(x(i))}{\sqrt{\sum_{i=0}^{N-1} x(i)^2 / N}}, \quad (1)$$

where:
x(i) is the multi-tone drive signal 330 shown in FIG. 3;
max (x(i)) is the maximum value of x(i) for all i;
N is the number of samples of x(i); and
CF(x) is the crest factor of the multi-tone drive signal 330.
Accordingly, the crest factor CF(x) is a ratio of the maximum amplitude and the root-mean-square of the multi-tone drive signal 330. Other methods of calculating a crest factor may be employed. As can be appreciated, a crest in the multi-tone drive signal may be different for different drive tone frequencies.

Figure 4:
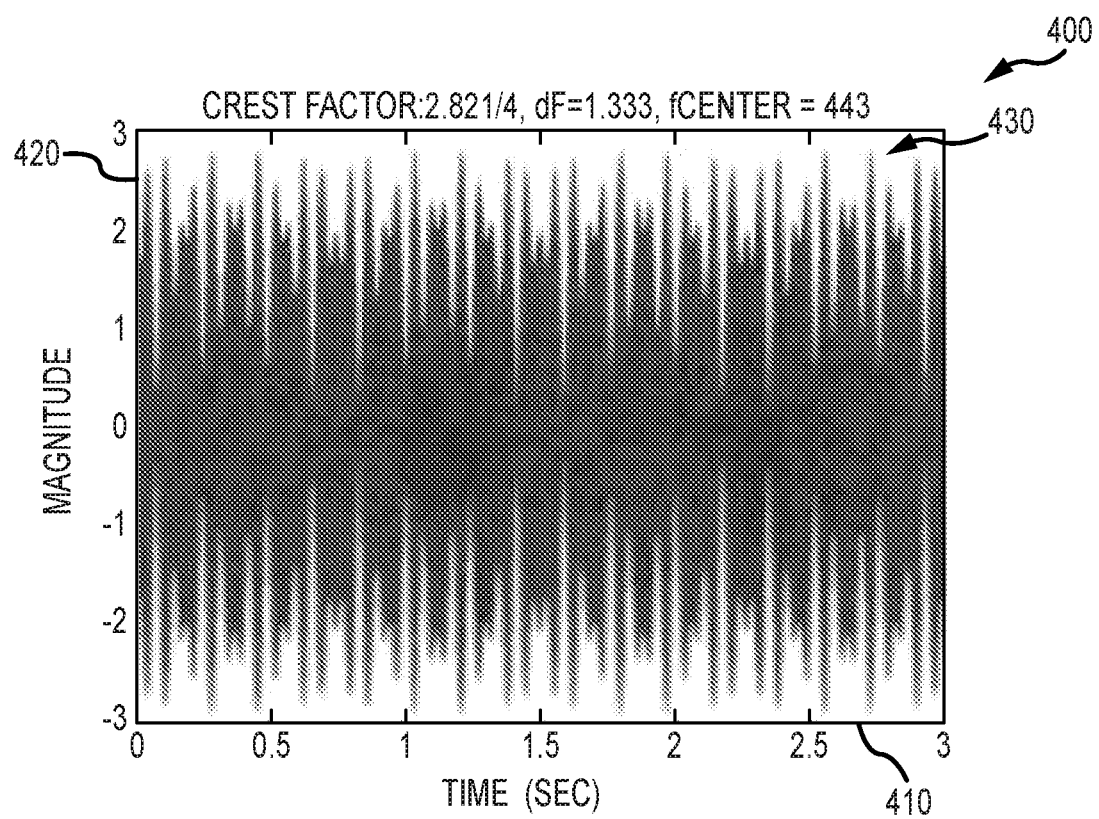
FIGS. 4 and 5 show graphs 400, 500 illustrating crests at two different drive tone frequencies.
Figure 5:
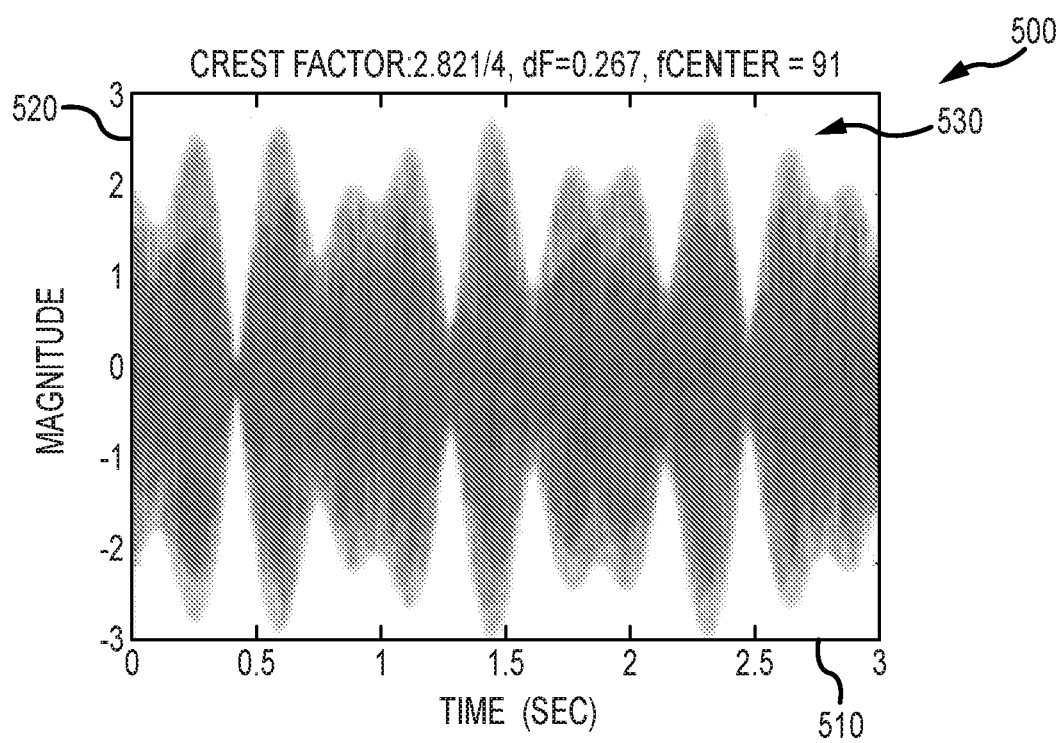
Figure 6:
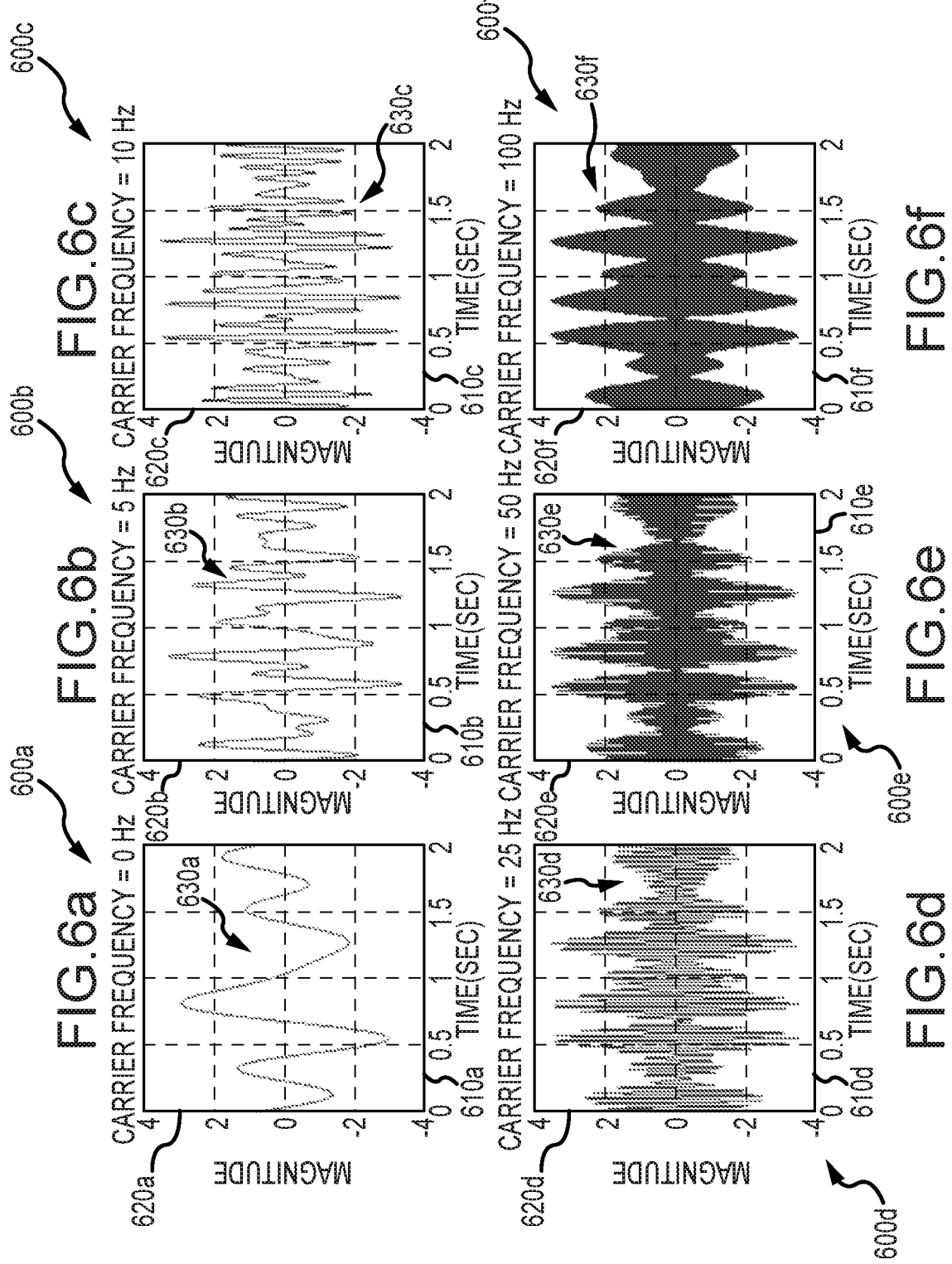
FIGS. 6a to 6f show a first through sixth graph 600a-600f illustrating different crests utilizing the same test tones at different drive tone frequencies.

FIGS. 4 and 5 show graphs 400, 500 illustrating crests at two different drive tone frequencies. The graphs 400, 500 include a time axis 410, 510 and a magnitude axis 420, 520. The time axis 410, 510 is in units of seconds and range from 0 to 3 seconds. The magnitude axis 420, 520 is unit-less and ranges from –3 to 3. The graphs 400, 500 include multi-tone drive signals 430, 530. In FIG. 4, the multi-tone drive signal 430 has a carrier or drive tone frequency of about 443 Hz. In FIG. 5, the multi-tone drive signal 530 has a carrier or drive tone frequency of 91 Hz. In both cases the crest factor is 2.821. Accordingly, the different carrier or drive tone frequencies may have the same crest factor.

The frequency spacings can be set at a base band or at the pass band. The base band refers to the frequencies of the test tones before the test tones are modulated to the carrier or drive tone frequencies. For example, the frequencies of the test tones may be established about a center frequency of 1 Hz. The test tones can be modulated to other carrier frequencies so the same baseband test tones and their frequency spacings can be used for different products, as is shown in FIGS. 4 and 5 and discussed in more detail in the following.

FIGS. 6a to 6f show a first through sixth graph 600a-600f illustrating different crests utilizing the same test tones at different drive tone frequencies. As shown in FIGS. 6a to 6f, the first through sixth graph 600a to 600f respectively include time axes 610a to 610f and magnitude axes 620a to 620f. The first through sixth graph 600a-600f include multi-tone drive signals 630a to 630f at different drive tone frequencies for a common set of test tones. In the first graph 600a, the multi-tone drive signal 630a is comprised of the common set of test tones without a drive tone. Accordingly, the carrier frequency shown is 0 Hz. The second through sixth multi-tone drive signals 630b through 630f respectively have carrier or drive tone frequencies of 5, 10, 25, 50, and 100 Hz.

As can be seen, the magnitude of the crests in the multi-tone drive signals 630a-630f increase as the carrier frequency increases. The first multi-tone drive signal 630a has a crest with an amplitude of about 3 and the sixth multi-tone drive signal 630f has a crest with an amplitude of about 3.8. Accordingly, although the amplitude of the crests may be the same for different carrier frequencies as is shown in FIGS. 4 and 5, the amplitude of the crests may also be different due to different carrier frequencies, as is shown in FIGS. 6a through 6f.

The same set of test tones in the multi-tone drive signal may be employed at different carrier frequencies by modulating the test tones. For example, with reference to FIGS. 4 and 5, baseband frequency spacings may be respectively multiplied by dF values of 1.333 and 0.267 to determine corresponding frequency spacings for carrier frequencies of 443 and 91 Hz. The dF values may represent the width of a demodulation window around each of the test tone frequencies. Accordingly, minimizing a crest of a multi-tone drive signal may include minimizing a crest of test-tones at a base band frequency as well as other carrier or drive tone frequencies.

Figure 7:
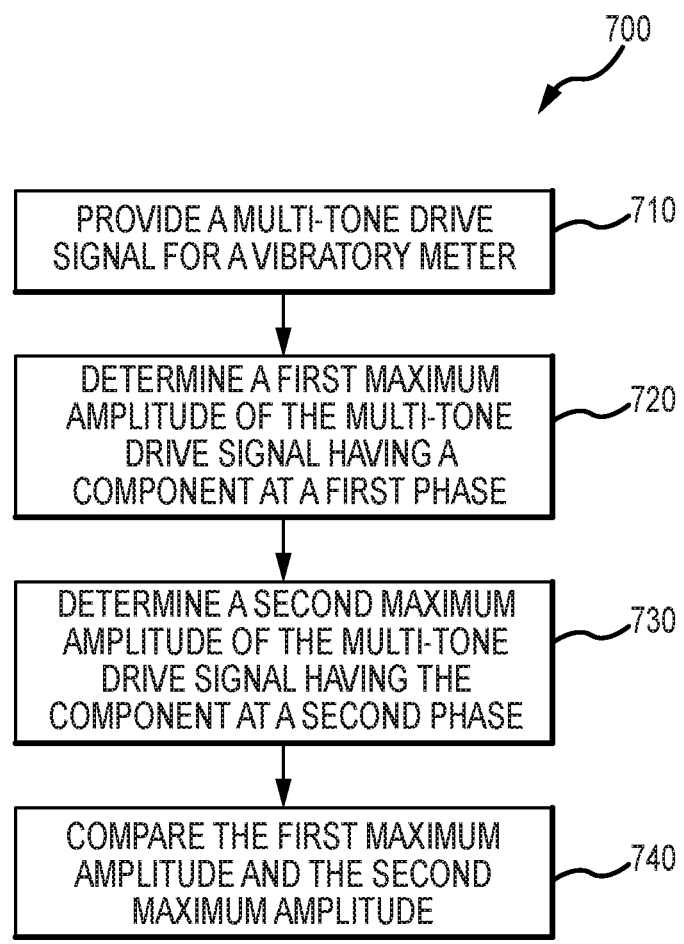
FIG. 7 shows a method 700 of minimizing a crest in a multi-tone drive signal in a vibratory meter.

FIG. 7 shows a method 700 of minimizing a crest in a multi-tone drive signal in a vibratory meter. As shown in FIG. 7, the method 700 begins in step 710 by providing a multi-tone drive signal for a vibratory meter. In step 720, the method 700 determines a first maximum amplitude of the multi-tone drive signal having a component at a first phase. In step 730, the method determines a second maximum amplitude of the multi-tone drive signal having the component at a second phase. That is, in steps 720 and 730, the maximum amplitude of the multi-tone drive signal is determined when the same component is at two different phases: the first phase and the second phase. In step 740, the method 700 compares the first maximum amplitude and the second maximum amplitude.

In step 710, the method 700 can provide the multi-tone drive signal for, for example, the vibratory meter 5 described above with reference to FIG. 1. The multi-tone drive signal may or may not include the drive tone. For example, the multi-tone drive signal may be similar to the multi-tone drive signal shown in FIG. 6a, which only includes test tones. Alternatively, the multi-tone drive signal may be similar to the multi-tone drive signal 330 shown in FIG. 3. For multi-tone drive signals that include a drive tone, the resonant frequency of the sensor assembly 10 can be determined using the sensor signals 165l, 165r. For example, the resonant component can track the resonant frequency of the sensor assembly 10 using a feedback loop, although any suitable method may be employed.

In step 720, the method 700 can determine the first maximum amplitude for, for example, the multi-tone drive signal 330 by setting a phase of one of the test tones relative to the first phase. The first phase may be in any suitable form, such as phase angle relative to the drive tone, a time difference between the tones, etc. The phase can also be in any unit and represented by any value. For example, the phase angle may be represented by a 1 or −1, where 1 is a phase angle of zero degrees and −1 represents a phase angle of 180 degrees. That is, only the phase angles of 0 or 180 degrees are being considered when determining the first maximum amplitude and the second maximum amplitude. Accordingly, phases associated with a minimal crest amplitude may be represented by a vector, such as [1 1], which corresponds to two test tones that are in-phase or, with more particularity, have a zero phase relative to each other and the drive tone. Alternative representations of the phase angles may be employed, including arbitrary phase relationships not restricted to a simple sign change.

In step 730, the method 700 can determine the second maximum amplitude by setting the component to a second phase. With respect to the multi-tone drive signal 330 shown in FIG. 3, the component may be set to the second phase relative to the phase of the drive tone, which may remain the same. Additionally, the phases of the other test tones may also remain the same as when the first maximum amplitude was measured. With reference to the multi-tone drive signal 630a shown in FIG. 6a, the component may be set to the second phase while the phases of the other test tones remains the same as when the first maximum amplitude was measured.

In step 740, the method 700 can compare the first and second maximum amplitudes to determine, for example, which of the first and second phase is associated with a lesser of the first and second maximum amplitude, which is a minimal crest amplitude. The comparison between the first and second maximum amplitudes may be direct or indirect. For example, a value of the first maximum amplitude may be directly compared to a value of the second maximum amplitude. Alternatively, the values of the first and second maximum amplitudes may be used to determine other corresponding values, such as a first and second crest factor CF(x) determined using the above equation (1). The first and second maximum amplitudes can be compared by comparing the first and second crest factors CF(x). The first and second maximum amplitude may be compared using other values.

As can be appreciated, the multi-tone drive signal relied on to determine the first and second maximum amplitude may be an actual multi-tone drive signal that is, for example, provided by the meter electronics 20 or a simulated drive signal that is determined using virtual objects in a computer simulation. Accordingly, a system using tangible or virtual objects may be used to provide the multi-tone drive signal having the non-resonant component with a phase set at the first or the second phase and to determine which of the first or second phase is associated with the minimal crest amplitude. An exemplary system is described below.

Figure 8:
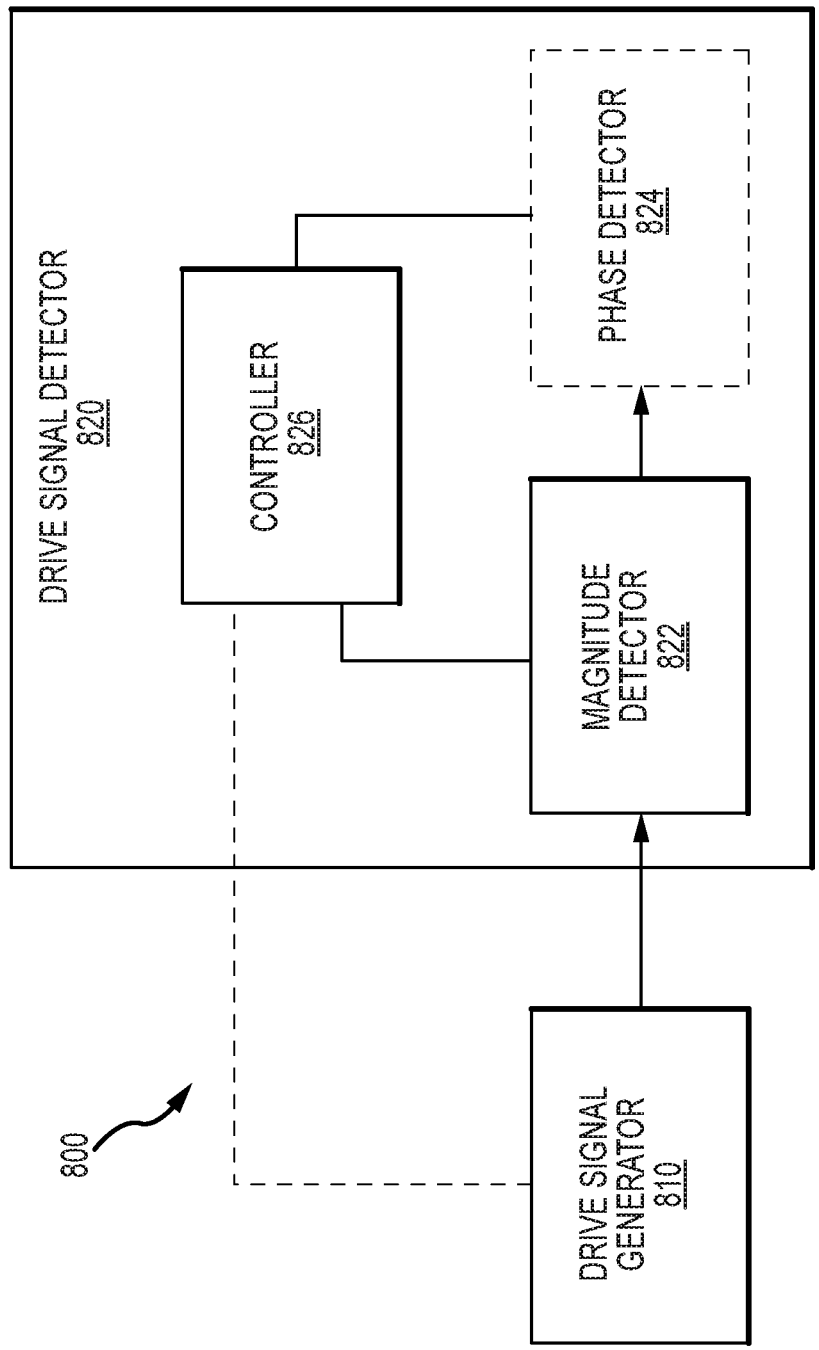
FIG. 8 shows a system 800 comprising a drive signal generator 810 and a drive signal detector 820.

FIG. 8 shows a system 800 comprising a drive signal generator 810 and a drive signal detector 820. The drive signal generator 810 is communicatively coupled to the drive signal detector 820. The drive signal generator 810 is configured to generate and provide a multi-tone drive signal, such as the multi-tone drive signal 330 described above, to the drive signal detector 820. The system 800, drive signal generator 810, and drive signal detector 820 may be tangible and/or virtual (e.g., computer simulation) objects. The drive signal generator 810 may also provide information about the multi-tone drive signal, such as a phase of one or more components in the multi-tone drive signal.

More specifically, the drive signal generator 810 may be configured to provide the multi-tone drive signal, such that the multi-tone drive signal includes a component with a phase. The drive signal generator 810 can set the phase of the component, which may be a drive tone or a test tone in the multi-tone drive signal, to a first phase. The drive signal generator 810 may also set the component to a second phase and provide the multi-tone drive signal to the drive signal detector 820.

The drive signal detector 820 may be configured to measure an amplitude of the multi-tone drive signal. For example, the drive signal detector 820 can measure the amplitude of the multi-tone drive signal having the component with the first phase over a period of time and determine a first maximum amplitude of the multi-tone drive signal. The drive signal detector 820 can also measure the amplitude of the multi-tone drive signal having the same component at the second phase over a period of time and determine a second maximum amplitude.

The drive signal detector 820 may also compare the first maximum amplitude of the multi-tone drive signal having the component at the first phase and the second maximum amplitude of the multi-tone drive signal having the component at the second phase. Based on this comparison, the drive signal detector 820 can determine which of the first maximum amplitude value and the second maximum amplitude value is a minimal crest amplitude. The drive signal detector 820 can also determine which of the first phase value and the second phase value is associated with the minimal crest amplitude.

The drive signal detector 820 is shown as being comprised of a magnitude detector 822, an optional phase detector 824, and a controller 826. The magnitude detector 822 can measure an amplitude of the multi-tone drive signal provided by the drive signal generator 810. The phase detector 824, which is illustrated as being optional by dashed lines, can determine a phase of the multi-tone drive signal. Alternatively, the phase of the multi-tone drive signal may be known from the drive signal generator 810 provided by signal path shown in dashed lines.

As can be appreciated, the method 700 and system 800 can perform additional steps. For example, maximum amplitudes associated with other phases can be compared to the maximum amplitude associated with the first or second phase. Accordingly, if maximum amplitudes of three phases are compared, then the minimal crest amplitude would be of the three phases. The method 700 and the system 800 may also compare maximum amplitudes of multi-tone drive signals with additional components. For example, a phase of a second or additional component in the multi-tone drive signal may also be at the first and second phase. More specifically, the phase of the component in the multi-tone drive signal may be at the first phase while the additional or second component is at the first and second phase. The maximum amplitudes associated with the additional or second component at the first and second phase may be compared to determine a minimal crest amplitude. Additionally or alternatively, the comparison between the maximum amplitudes can be done at different drive tone or carrier frequencies. For example, the method 700 and system 800 may also compare the maximum amplitudes at the first phase and the second phase for not only the base band frequency but also for one or more drive tone frequencies, such as the drive tone frequencies of 91 and 443 Hz of FIGS. 4 and 5.

Accordingly, for the multi-tone drive signal shown in FIG. 2, which is comprised of the drive tone 230 (the drive tone) and four test tones 240, maximum amplitudes associated with phases of the four test tones 240 may be compared to minimize a crest. For example, the method 700 and system 800 can hold the drive tone 230, which is the drive tone, at a zero phase, and compare maximum amplitudes associated with the second signal 240a at the first through fourth phase. The third through fifth signals 240b-240d can also be at the first through fourth phase to compare their associated maximum amplitudes to determine a minimal crest amplitude. Accordingly, method 700 and system 800 can determine the phases of the second through fifth signal 240a-240d to minimize a crest of the multi-tone drive signals.

In one example, such as when the phase angles of 1 (0 degrees) and −1 (180 degrees) are determined for four test tones, the phase angles associated with a minimal crest amplitude may be [−1 1 1 1]. More specifically, with reference to the multi-tone drive signal shown in FIGS. 4 and 5, where the frequency spacings are set at a base band vector of [−6 −4 5 7], which represents the frequency spacings between the carrier frequency of the base tone (e.g., 94 Hz, 96 Hz, 105 Hz, and 107 Hz for base band carrier frequency of 100 Hz and dF=1), the phase angles associated with the minimal crest amplitude of 2.821 may be [−1 1 1 1]. Those skilled in the art will appreciate that while arbitrary phases (other than 0 or 180 degrees) may produce a lower overall crest factor, there may be inherent efficiencies in restricting the possible phase space for some applications.

The vibratory meter 5, method 700, and system 800 described above can minimize a crest in a multi-tone drive signal. For example, a new and improved vibratory meter 5 that generates a multi-tone drive signal with components at phases determined to minimize crests in the multi-tone drive signal with components at predetermined frequencies. More specifically, the phases of the test tones are determined such that, for example, the crests in the multi-tone drive signal do not saturate a drive amplifier in the meter electronics 20. Accordingly, intermodulation distortion signals that would otherwise be caused by crests that saturated the drive amplifier are not produced. This can ensure that the demodulation windows in the meter electronics 20 do not include interfering intermodulation distortion signal and, therefore, the characterization of the frequency response of the sensor assembly 10 may be accurate. As a result, corrosion, erosion, and deposits may be accurately detected by the meter verification.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other methods and systems of minimizing a crest in a multi-tone drive signal and not just to the embodiments described above and shown in the accompanying figures. Accordingly, the scope of the embodiments described above should be determined from the following claims.

We claim:

1. A system (800) for minimizing a crest in a multi-tone drive signal in a vibratory meter (5), said system (800) comprising:
   a drive signal generator (810) configured to generate the multi-tone drive signal for the vibratory meter (5);
   a drive signal detector (820) configured to:
      receive the multi-tone drive signal;
      determine a first maximum amplitude of the multi-tone drive signal having a component at a first phase;
      determine a second maximum amplitude of the multi-tone drive signal having the component at a second phase; and
      compare the first maximum amplitude and the second maximum amplitude;
      wherein the first maximum amplitude and the second maximum amplitude are compared at two or more different carrier frequencies of the component.

2. The system (800) of claim 1, wherein the drive signal detector (820) is further configured to determine which of the first maximum amplitude value and the second maximum amplitude value is a minimal crest amplitude based on the comparison.

3. The system (800) of claim 2, wherein the drive signal detector (820) is further configured to determine which of the first phase and the second phase is associated with the minimal crest amplitude.

4. The system (800) of claim 1, wherein the drive signal detector (820) is further configured to determine a third maximum amplitude of the multi-tone drive signal having the component at a third phase and a fourth maximum amplitude of the multi-tone drive signal having the component at a fourth phase.

5. The system (800) of claim 1, wherein the drive signal generator (810) is further configured to generate the multi-tone drive signal comprising a drive tone and at least one additional component having a phase at one of the first phase and the second phase.

6. A method for minimizing a crest in a multi-tone drive signal in a vibratory meter, said method comprising:
   receiving the multi-tone drive signal;
   determining a first maximum amplitude of the multi-tone drive signal having a component at a first phase;
   determining a second maximum amplitude of the multi-tone drive signal having a component at a second phase; and
   comparing the first maximum amplitude and the second maximum amplitude;
   wherein the first maximum amplitude and the second maximum amplitude are compared at two or more different carrier frequencies of the component.

7. The method of claim 6, further comprising determining which of the first maximum amplitude value and the second maximum amplitude value is a minimal crest amplitude based on the comparison.

8. The method of claim 7, further comprising determining which of the first phase and the second phase is associated with the minimal crest amplitude.

9. The method of claim 6, further comprising determining a third maximum amplitude of the multi-tone drive signal having the component at a third phase and a fourth maximum amplitude of the multi-tone drive signal having the component at a fourth phase.

10. The method of claim 6, further comprising generating the multi-tone drive signal comprising a drive tone and at least one additional component having a phase at one of the first phase and the second phase.

* * * * *